G. DRAKE.
CAR BRAKE SHOE.
No. 75,001. Patented Mar. 3, 1868.
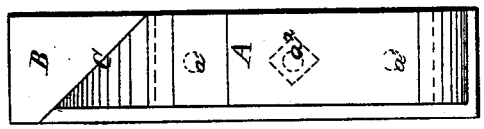
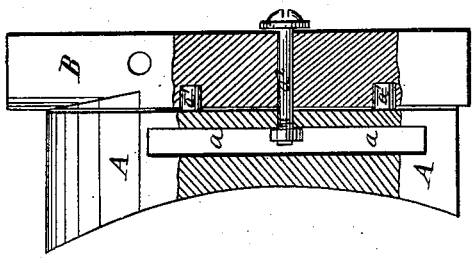
Witnesses:
W. C. Ashkettle
Theo Fusche
Inventor:
G. Drake
per Munn & Co
Attorneys

United States Patent Office.

GARDNER DRAKE, OF FARMINGTON, MAINE.

*Letters Patent No. 75,001, dated March 3, 1868.*

---

IMPROVEMENT IN CAR-BRAKE SHOES.

---

The Schedule referred to in these Letters Patent and making part of the same.

---

TO ALL WHOM IT MAY CONCERN:

Be it known that I, GARDNER DRAKE, of Farmington, in the county of Franklin, and State of Maine, have invented a new and improved Brake-Block Lining; and I do hereby declare that the following is a full, clear, and exact description thereof, which will enable those skilled in the art to make and use the same, reference being had to the accompanying drawings, forming part of this specification.

This invention relates to a new and improved method of constructing the linings of the blocks of car or wagon-brakes, and attaching the same to said blocks, whereby the brakes of cars, wagons, &c., are rendered more durable and less liable to injure the wheels, and whereby the wheels are kept free from snow or soil.

It consists of a cast-iron lining, provided with a slot through the same, by means of which the bolt securing the same to the block and the nut on the same are not liable to wear from friction against the wheel, and to admit air to prevent the wooden connections from burning.

It consists, also, of the lining being provided with starts or projections on the back side of the lining, to steady the same on the brake-block.

It consists, also, in the lining being bevelled off on the upper end, so as to serve for a scraper or cleaner to remove snow and soil from the wheel, and throwing the same outwards clear of the track. In the accompanying plate of drawings—

Figure 1 represents a central vertical section of my invention, showing the same attached to a brake-block.

Figure 2 is a front view of the same.

Similar letters of reference indicate corresponding parts.

A is the lining; $a$ is a slot in the same; $a^1$ are starts on the same; $a^2$ is a bolt, securing the same to the brake-block; B is the brake-block; C is the upper end of the lining, showing the bevelled end. The brake-block B is of the same material and form as the brake-blocks now commonly in use, and is secured in the ordinary way to a cross-bar, through which the same is attached to a car or wagon and operated. The lining A is made of cast iron-for the reason that the same is less liable to wear, and less liable, also, to injure the wheel upon which the same is used, by friction upon the same, than either steel or wrought or malleable iron. Said lining A is of any convenient size, or of like size of the same now commonly in use, and is curved on the front or face side of the same, to conform to the circumference of the wheel upon which the same is to be used, and is provided with a slot or mortise entirely through the same, and nearly the whole length thereof, in a line parallel with the back of the lining, said slot being of sufficient width to receive the end of the bolt $a^2$ and a nut thereon, and so that said nut may be, at any time, removed, and to receive a wrench, by means of which said nut is turned, the object of the said slot $a$ being to admit air, so as to prevent the lining A from heating from friction with the wheel, so as not to burn the block B, and so as that the end of the bolt $a^2$, and the nut therein, may not be injured by wearing against the wheel. Said lining A is provided on the side opposite to the curved face of the same with two or more starts, $a^1$, which, fitting into holes in the block B, prevent the same from working on the bolt $a^2$. Said lining has a hole bored in the centre of the same, on the same side as the starts $a^1$, into the slot $a$, to receive a bolt, $a^2$, by means of which said bolt $a^2$ and a nut on the end of the same in the slot $a$, the lining A is firmly held against the brake-block B, the back of the lining A and the front of the block having plane faces, so as that one will fit fairly upon the other, as shown in the drawing. The upper end of the lining A is bevelled off outwards and downwards from one side of the said lining A to the other side thereof, said bevel being extended also into the block B, the object of which is to clean the wheel to which the brake is applied from snow or soil, and throw the same outwards beyond and clear from the track on which said wheel runs, so as to admit no snow or soil to remain on the face of said wheel, whereby the same may be injured or impeded, and whereby, also, no injury from wear may come to the lining A.

The operation is readily seen from the above description and the drawing.

Said lining A may be attached to car-brake blocks now already in use, and constructed as above described. It constitutes a cheap and durable lining for car or wagon-brake blocks, the advantages of which are that they will not heat, so as to burn the adjacent wood, and that the bolt by which the lining is attached to brake-block is not injured by wear against the wheel, and also that the wheel to which the brake is applied is kept clean from snow or soil, the same being thrown outwards and clear of the track.

I claim as new, and desire to secure by Letters Patent—

1. The combination of the brake-shoe A, having the slot $a$, and the bevelled end C, as herein described, for the purpose specified.

2. The combination of the slotted shoe A with the pins $a^1$, bolt $a^2$, and block B, as herein described, for the purpose specified.

GARDNER DRAKE.

Witnesses:
GEORGE H. MORRILL,
WILLIAM B. CASE.